US009154921B2

(12) United States Patent
Vij et al.

(10) Patent No.: US 9,154,921 B2
(45) Date of Patent: Oct. 6, 2015

(54) METHOD AND APPARATUS FOR SHARING USER INFORMATION IN A GROUP COMMUNICATION NETWORK

(75) Inventors: Gajinder Singh Vij, San Diego, CA (US); Beth Ann Brewer, La Mesa, CA (US); Douglas M. Crockett, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 500 days.

(21) Appl. No.: 10/756,163

(22) Filed: Jan. 12, 2004

(65) Prior Publication Data
US 2005/0153724 A1    Jul. 14, 2005

(51) Int. Cl.
*H04W 4/06* (2009.01)
*H04W 76/00* (2009.01)

(52) U.S. Cl.
CPC .............. *H04W 4/06* (2013.01); *H04W 76/005* (2013.01)

(58) Field of Classification Search
CPC .............................. H04W 4/06; H04W 76/005
USPC ........................................ 455/515–521, 456.1
See application file for complete search history.

(56) References Cited

U.S. PATENT DOCUMENTS

| 6,032,051 | A  | * | 2/2000  | Hall et al. ...................... 455/518 |
| 6,760,589 | B1 | * | 7/2004  | Hobbis ........................... 455/443 |
| 2002/0150091 | A1 | * | 10/2002 | Lopponen et al. ............. 370/389 |
| 2003/0037103 | A1 | * | 2/2003  | Salmi et al. .................... 709/203 |
| 2003/0119540 | A1 | * | 6/2003  | Mathis ........................... 455/518 |
| 2003/0154293 | A1 | * | 8/2003  | Zmolek .......................... 709/228 |
| 2003/0208545 | A1 | * | 11/2003 | Eaton et al. .................... 709/206 |
| 2004/0082352 | A1 | * | 4/2004  | Keating et al. ................. 455/519 |
| 2004/0267887 | A1 | * | 12/2004 | Berger et al. ................... 709/206 |
| 2005/0009542 | A1 | * | 1/2005  | Oprescu-Surcobe et al. 455/466 |
| 2005/0054361 | A1 | * | 3/2005  | Turcanu et al. ................ 455/518 |
| 2005/0071428 | A1 | * | 3/2005  | Khakoo et al. ................. 709/204 |
| 2005/0262198 | A1 | * | 11/2005 | Leppanen et al. ............. 709/204 |

FOREIGN PATENT DOCUMENTS

| KR | 102003003389  | 5/2003 |
| KR | 1020030037256 | 5/2003 |
| RU | 2073913       | 2/1997 |
| WO | WO9205556     | 4/1992 |

OTHER PUBLICATIONS

International Search Report and Written Opinion—PCT/US2004/040920, International Search Authority—European Patent Office—Feb. 22, 2007.

* cited by examiner

*Primary Examiner* — Raymond Dean
(74) *Attorney, Agent, or Firm* — Michael F. Taveira

(57) ABSTRACT

The disclosed embodiments provide methods and apparatus for detecting or announcing presence and/or location information in a wireless communication network. In one aspect, a method for sharing user information in a wireless communication network includes sending an alert from an originator to a target, the alert including information about the originator and requesting information about the target, receiving information by the originator from the target in response to the alert, and updating information in the originator about the target, based on the received information. In another aspect, a method includes sending at least one alert from an originator, requesting information about at least one target user; receiving information by the originator in response to the alert; and updating information by the originator about the target user, based on information received.

38 Claims, 5 Drawing Sheets

METHOD AND APPARATUS FOR SHARING USER INFORMATION IN A GROUP COMMUNICATION NETWORK

FIELD

The present invention relates to point-to-point or point-to-multipoint communications systems. More specifically, the present invention relates to methods and apparatus for detecting, sharing, and/or announcing user presence and/or location information in a group wireless communication network.

BACKGROUND

A class of wireless services intended for quick, efficient, one-to-one or one-to-many (group) communication has existed in various forms for many years. In general, these services have been half-duplex, where a user presses a "push-to-talk" (PIT) button on a phone/radio to initiate a group communication. If granted the floor, the talker then generally speaks for a few seconds. After the talker releases the PTT button, other users who are available may request the floor. These services have traditionally been used in applications where one person needs to communicate with a group of people, such as field service personnel or taxi drivers, generally known as group communication services.

There is a need, therefore, for mechanisms that allow a user or a group of users to efficiently detect or announce information, such as user presence and/or location information, to other user or group of users.

SUMMARY

The disclosed embodiments provide novel and improved methods and apparatus for detecting and/or announcing user presence and/or location information in a wireless communication network. In one aspect, the method for sharing user information in a wireless communication network includes sending an alert from an originator to a target, the alert including information about the originator and requesting information about the target, receiving information by the originator from the target in response to the alert, and updating information in the originator about the target, based on the received information.

In another aspect, the method includes sending at least one alert from an originator requesting information about at least one target user, receiving information by the originator in response to the alert, and updating information by the originator about the target user, based on information received.

In one aspect, an apparatus for sharing user information in a wireless communication network includes a memory unit, a receiver, a transmitter, and a processor communicatively coupled with the memory unit, the receiver, and the transmitter. The processor is capable of carrying out the above-mentioned methods.

BRIEF DESCRIPTION OF THE DRAWINGS

The features and advantages of the present invention will become more apparent from the detailed description of the embodiments set forth below.

DETAILED DESCRIPTION

Figure 1:
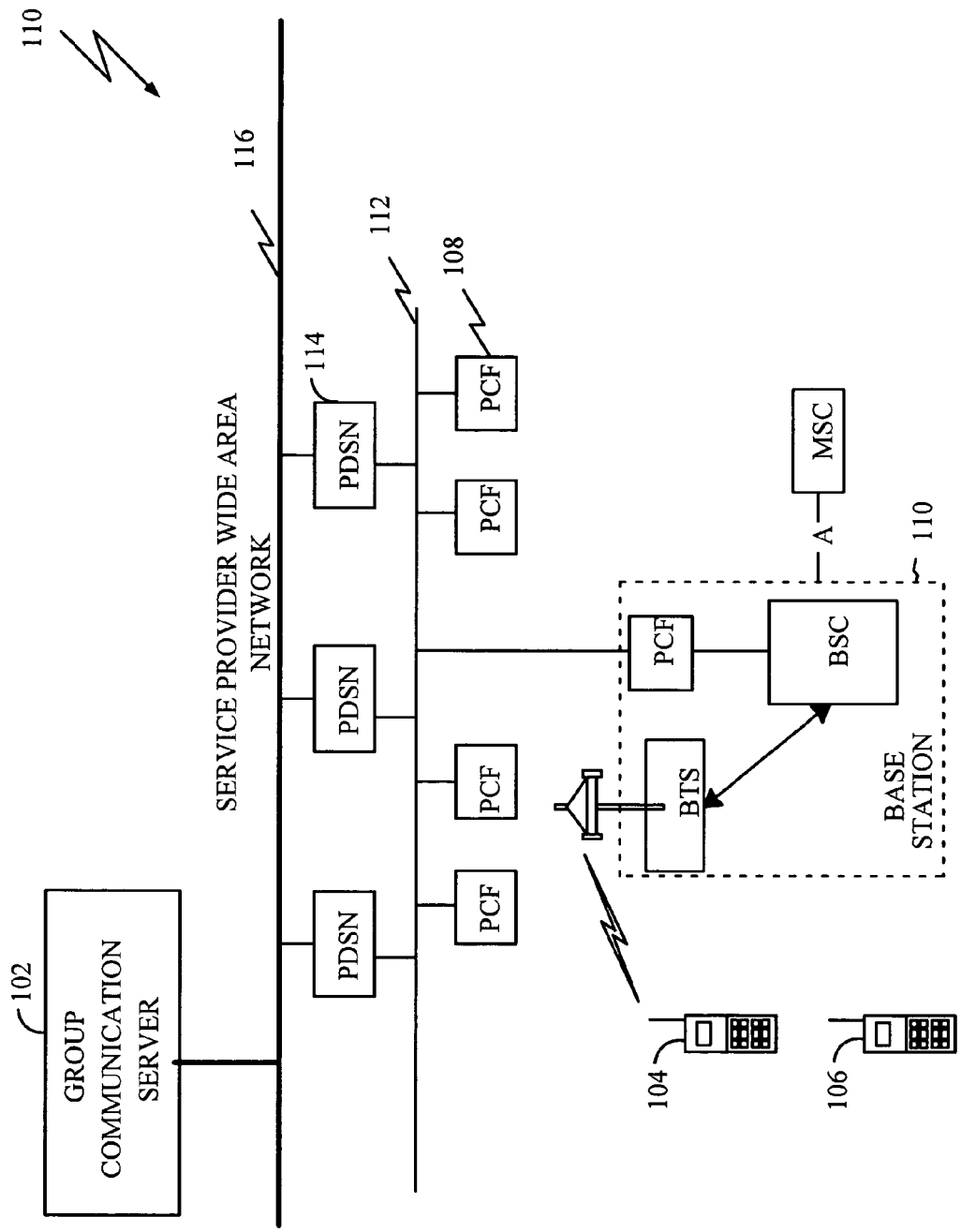
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group communication server (GCS) 102, which may be deployed in either a centralized deployment or a regionalized deployment. Group communication server 102 may be implemented as known in the art, including one or more processor, one or more memory units, and input/out hardware and software modules for various media communications, e.g., IP media communication.

Group communication devices (CDs) 104 and 106, which may be deployed such as CDMA (e.g., cdma2000) handsets, for example, may request packet data sessions using a data service option. Each CD may use the session to register its Internet protocol (IP) address with the group communication server to perform group communication initiations. In one embodiment, group communication server 102 is connected to the service provider's packet data service nodes (PDSNs) through service provider's network 116. CDs 104 and 106, upon requesting packet data sessions from the wireless infrastructure, may have IP connectivity to group communication server 102 through the PDSNs 114. Each PDSN may interface to a base station controller (BSC) through a packet control function (PCF) 108 and a network 112. The PCF may be co-located with the BSC within a base station (BS) 110.

A packet data service node may fall in one of several states, e.g., active or connected state, dormant state, and null or inactive state. In the active or connected state, a active traffic channel exists between the participating CD and the BS or BSC, and either side may send data. In the dormant state, no active traffic channel exists between the participating CD and the BSC, but a point-to-point protocol (PPP) link is maintained between the participating CD and the PDSN. In the null or inactive state, there is no active traffic channel between the participating CD and the BSC, and no PPP link is maintained between the participating CD and the PDSN.

Each one of CDs 104 and 106 may request packet data sessions. As part of establishing a packet data session, each CD may be assigned an IP address. Each CD may perform a registration process to notify group communication server 102 of the CD's IP address. Registration may be performed using an IP protocol, such as session initiation protocol (SIP) over user datagram protocol (UDP). The IP address of a CD may be used to contact the CD when the corresponding user is invited into or informed of a group communication.

Once a group communication is established, CDs 104 and 106 and group communication server 102 may exchange media and signaling messages. In one embodiment, media may be exchanged between the participating CDs and the group communication server by using real-time protocol (RTP) over UDP. The signaling messages may also be exchanged by using a signaling protocol over UDP.

Group communication system 100 performs several different functions in order to operate group communication services. The functions that relate to the user side include user registration, group communication initiation, group communication termination, sending messages to group participants, late join to a group communication, talker arbitration, adding members to a group, removing members from a group, unregistering a member, and user authentication. The functions that relate to system preparation and operation include administration and provisioning, scalability, and reliability.

Figure 2:
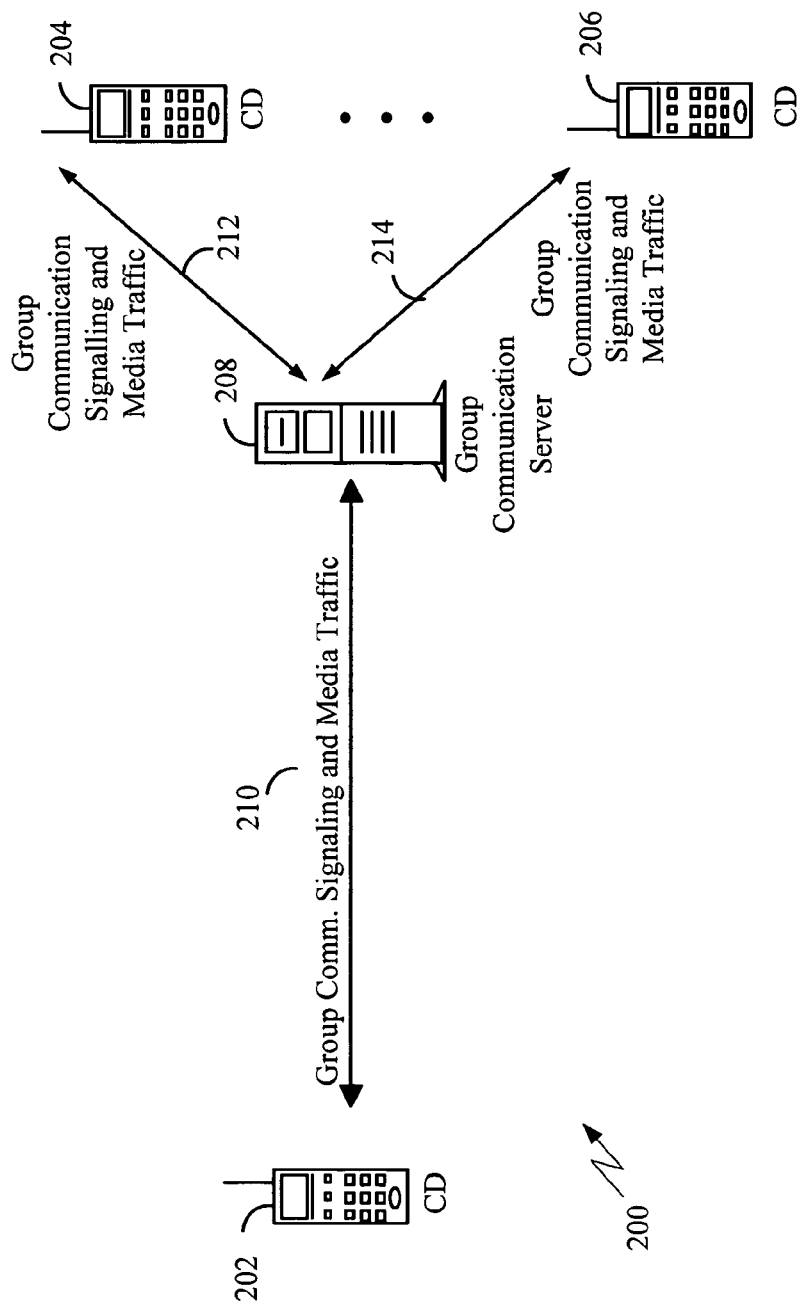
FIG. 2 illustrates how several communication devices interact with a group communication server.

FIG. 2 illustrates a group communication arrangement 200 for showing how CDs 202, 204, and 206 interact with a group communication server 208. Multiple group communication servers may be deployed as desired for large-scale groups. A user may input her desire to a CD 202, 204, 206 to initiate a communication session for exchanging communication media, e.g., data, voice, image, and/or video, with one or more CDs. In one embodiment, the user may first invite the target users(s) before starting to communicate media, by pushing an "invite" or a PTI button on a CD.

In FIG. 2, when CD 202 has permission to transmit media to other members of the group, CD 202 is known as the originator and may transmit media over an established channel. When CD 202 is designated as the originator, the remaining participants, CD 204 and CD 206, may not be permitted to transmit media to the group. Accordingly, CD 204 and CD 206 are designated as targets. As described above, CDs 202, 204, and 206 are connected to group communication server 208, using at least one channel. In one embodiment, channels 210, 212, and 214 may include a session initiation protocol (SIP) channel, a media-signaling channel, and a media traffic channel.

Figure 3:
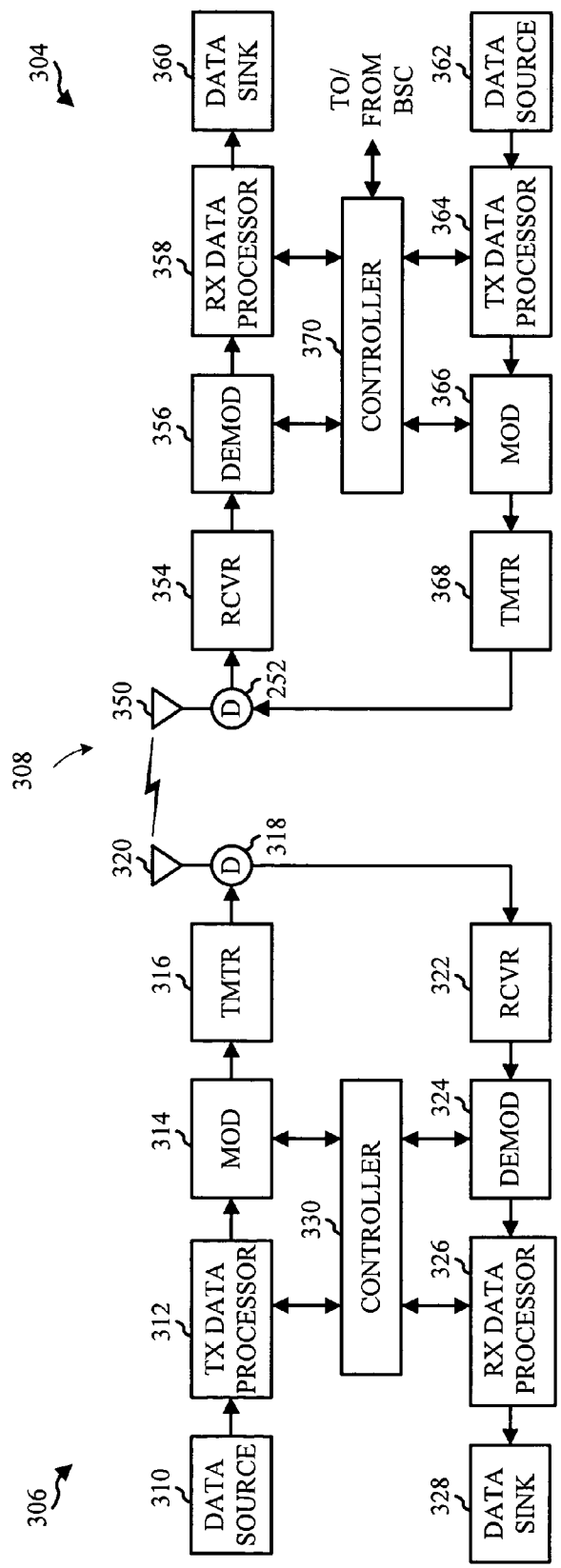
FIG. 3 illustrates one embodiment for an infrastructure for implementing various disclosed embodiments.

FIG. 3 is a simplified block diagram of one embodiment of an infrastructure including a base station/base station controller (BS/BSC) 304 and a communication device 306, which are capable of implementing various disclosed embodiments. For a particular media communication, voice, data, packet data, and/or alert messages may be exchanged between BS/BSC 304 and communication device 306, via an air interface 308. Various types of messages may be transmitted, such as messages used to establish a communication session between the base station and the communication device, registration and paging messages, and messages used to control a data transmission (e.g., power control, data rate information, acknowledgment, and so on). Some of these message types are described in further detail below.

For the reverse link, at communication device 306, voice and/or packet data (e.g., from a data source 310) and messages (e.g., from a controller 330) are provided to a transmit (TX) data processor 312, which formats and encodes the data and messages with one or more coding schemes to generate coded data. Each coding scheme may include any combination of cyclic redundancy check (CRC), convolutional, turbo, block, and other coding, or no coding at all. The voice, packet data, and messages may be coded using different schemes, and different types of messages may be coded differently.

The coded data is then provided to a modulator (MOD) 314 and further processed (e.g., covered, spread with short PN sequences, and scrambled with a long PN sequence assigned to the communication device). The modulated data is then provided to a transmitter unit (TMTR) 316 and conditioned (e.g., converted to one or more analog signals, amplified, filtered, and quadrature modulated) to generate a reverse link signal. The reverse link signal is routed through a duplexer (D) 318 and transmitted via an antenna 320 to BS/BSC 304.

At BS/BSC 304, the reverse link signal is received by an antenna 350, routed through a duplexer 352, and provided to a receiver unit (RCVR) 354. Alternatively, the antenna may be part of the wireless operator network, and the connection between the antenna and the BS/BSC may be routed through the Internet. BS/BSC 304 may receive media information and alert messages from communication device 306. Receiver unit 354 conditions (e.g., filters, amplifies, down converts, and digitizes) the received signal and provides samples. A demodulator (DEMOD) 356 receives and processes (e.g., despreads, decovers, and pilot demodulates) the samples to provide recovered symbols. Demodulator 356 may implement a rake receiver that processes multiple instances of the received signal and generates combined symbols. A receive (RX) data processor 358 then decodes the symbols to recover the data and messages transmitted on the reverse link. The recovered voice/packet data is provided to a data sink 360 and the recovered messages may be provided to a controller 370. Controller 370 may include instructions for receiving and sending alerts, and receiving and sending responses to alerts. The processing by demodulator 356 and RX data processor 358 are complementary to that performed at remote access device 306. Demodulator 356 and RX data processor 358 may further be operated to process multiple transmissions received via multiple channels, e.g., a reverse fundamental channel (R-FCH) and a reverse supplemental channel (R-SCH). Also, transmissions may be simultaneously from multiple communication devices, each of which may be transmitting on a reverse fundamental channel, a reverse supplemental channel, or both.

On the forward link, at BS/BSC 304, voice and/or packet data (e.g., from a data source 362) and messages (e.g., from controller 370) are processed (e.g., formatted and encoded) by a transmit (TX) data processor 364, further processed (e.g., covered and spread) by a modulator (MOD) 366, and conditioned (e.g., converted to analog signals, amplified, filtered, and quadrature modulated) by a transmitter unit (TMTR) 368 to generate a forward link signal. The forward link signal is routed through duplexer 352 and transmitted via antenna 350 to remote access device 306. Forward link signals include paging signals.

At communication device 306, the forward link signal is received by antenna 320, routed through duplexer 318, and provided to a receiver unit 322. Receiver unit 322 conditions (e.g., down converts, filters, amplifies, quadrature modulates, and digitizes) the received signal and provides samples. The samples are processed (e.g., despreaded, decovered, and pilot demodulated) by a demodulator 324 to provide symbols, and the symbols are further processed (e.g., decoded and checked) by a receive data processor 326 to recover the data and messages transmitted on the forward link. The recovered data is provided to a data sink 328, and the recovered messages may be provided to controller 330. Controller 330 may include instructions for receiving and sending alerts, receiving and sending responses to alerts, keeping status information about other users in a designated group of users, and updating status information.

A user or a group of users may detect or announce user information, such as user-presence, user availability, and/or user-location information, to other user or group of users, without placing a call, establishing a communication session, or burdening the server. In one embodiment, each user may alert members of a designated group when the user becomes available, e.g., the user goes online. This would eliminate the configuration problems associated with server-based solutions. Users may configure their group lists, as users may belong to multiple groups, and switch between groups, without requiring configuration changes at the server, according to one embodiment.

In one embodiment, user presence and/or location detection is announced through point-to-point alerts or group alerts (point-to-multipoint) on power up (Hello) and shutdown (Bye). Additional alerts may be sent periodically to detect if a user has has become unavailable without sending a "Bye" (e.g., to detect power or coverage loss).

For example, using user-initiated point-to-point alerts, user A sends a "Hello" alert, on power up, to the rest of members in a designated group (e.g., A, B, and C). If a point-to-point guaranteed delivery alert is used, user A receives an "Ack" alert if the alert is successfully delivered, or a "Nak" alert if it isn't. If an Ack alert is received from user B and a Nak alert is received from user C, user A figures out that user B is already online and user C is not. When user B, who is already online, receives a Hello alert from user A, user B determines that user A has come online. Later, when user A goes offline, user A sends a "Bye" message to users B and C. When user B receives the "Bye" message from user A, user B determines that user A is no longer online.

Figure 4A:
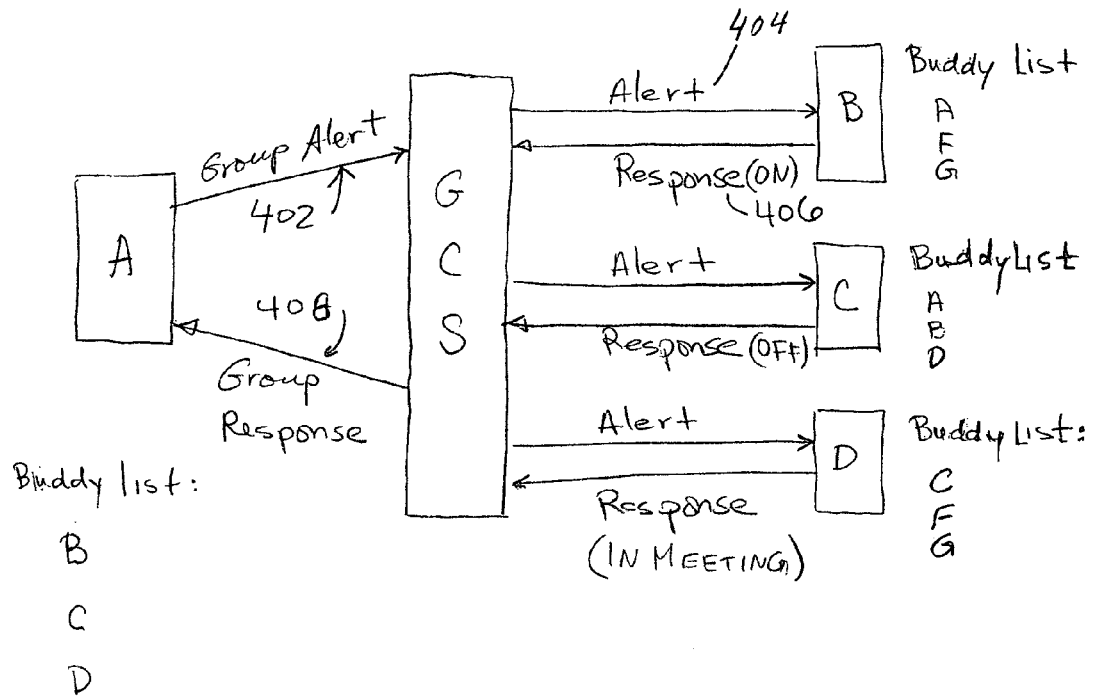
FIGS. 4(A) and 4(B) illustrate flow diagrams for detecting and/or announcing presence and/or location information.
Figure 4B:
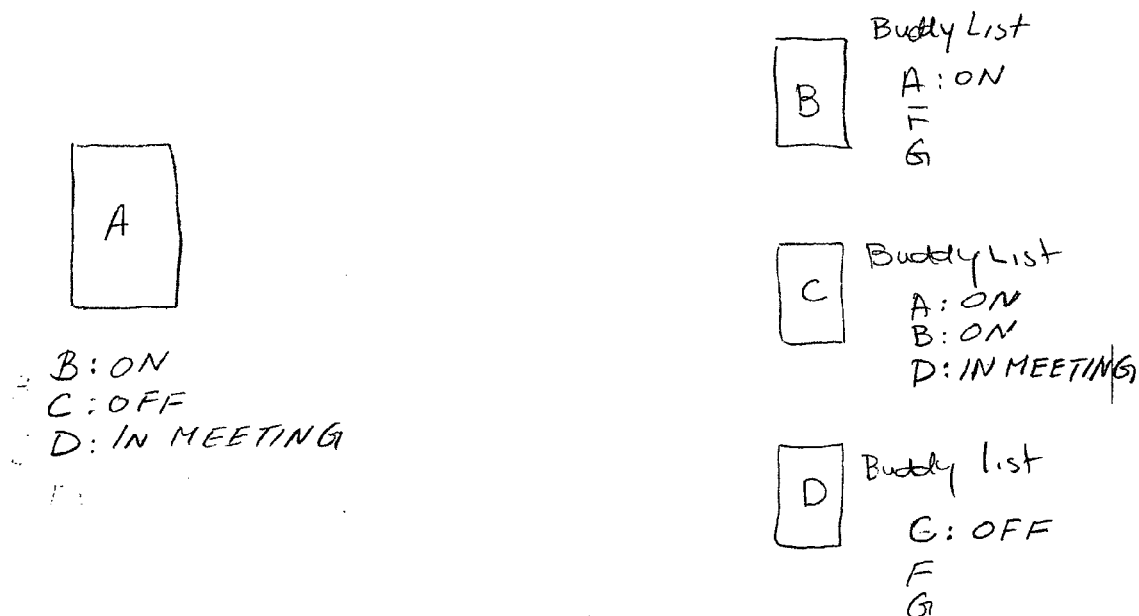
Figure 5:
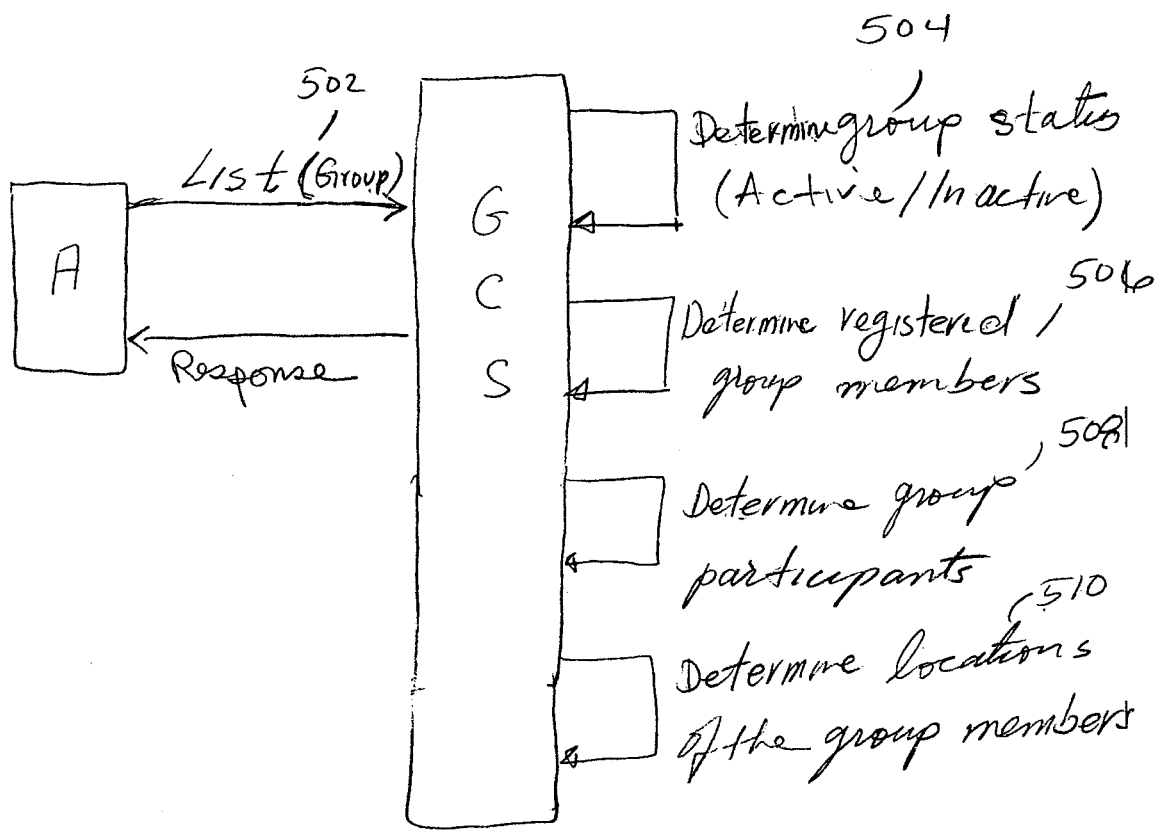
FIG. 5 illustrates a flow diagram for determining status information about a group of users.

FIGS. 4(A) and 4(B) illustrate flow diagrams for announcing and/or sharing presence and/or location information, according to one embodiment. User A may select a member list from a directory of stored individual and/or group member lists, and presses a button (e.g., the PTT button) on his or her CD, to announce his or her presence and/or location information to the selected group. User A may also create an ad-hoc group list, or designate a default group list for this purpose. For example, the designated group may include users B, C, and D, as shown by user A's "buddy list."

Upon activation by user A, user A's CD sends group alerts to target users B, C, and D, e.g., through the group communication server, as shown in step 402. The group message may include information such as user A's presence (e.g., "on," "off," "away," etc.), user A's location (e.g., "at work," "in meeting," "at lunch," etc.), and/or user A's availability (e.g., "busy," "on phone," etc.). In one embodiment, the group communication server sends an alert to each target user in the designated group (e.g., B, C, and D), as shown in step 404.

Each target user in the designated group that receives an alert may respond with a message, e.g., an alert, indicating the target user's status, as shown in step 406. For example, target user B may respond with an "ACK" response, indicating that user B is ON or available, user C may respond with a "NAK" response, indicating that user C is OFF or unavailable, user D may respond with a "in meeting" or "at airport" response.

In one embodiment, the group communication server receives the responses from the target group members (e.g., user B, C, and D), and forwards a group response to user A, as shown in step 408. Upon receiving the group response, user A may update the status of his or her buddy list to include information that user B is "ON," user C is "OFF," and user D is "in meeting" or "at airport."

In one embodiment, some or all of the target users (e.g., B, C, and D) may also update status information of their buddy list members. When such target users receive an alert from user A, in step 404, indicating that user A is ON, such target users may update their buddy lists to include information that user A is ON, if user A appears in buddy lists of such target users. As recognized in FIG. 4(A), user may have different personalized buddy lists to preserve their privacy. For better privacy, a user may block any number of other users from contacting the blocking user. So that no information about the blocking user may be shared with other blocked users.

In one embodiment, when any one of target users sends a status response to the GCS to be forwarded to user A, in step 406, the GCS may also send such responses to other ones of such target users to update their buddy list accordingly. For example when user B sends an "ACK" response, in step 406, indicating that user B is ON, the GCS may send the ACK response received from user B to target users C and D to update the status of user B to ON in their buddy lists, if user B appears in their buddy lists. FIG. 4(B) shows the final state of the user presence and/or location information exchange after user A sends the group alerts in step 402.

In one embodiment, a user may request the GCS to determine the status of a designated user or a group of users, determine the group members that are currently registered, and/or determine the group members who are participating in a group communication session. The user may choose an existing group name or create an ad-hoc group, and send the request for information about the group to the GCS, as shown in step 502. The GCS may provide status information about the designated group, e.g., whether the designated group is active or inactive, as shown in step 504, provide information about the members of the designated group who are registered, as shown in step 506, provide information about the members of the designated group who are participating in a current communication session, as shown in step 508, and/or provide information, e.g., location information, about the group members, as shown in step 510.

For example, when user A requests information about a group of users that includes seven members (e.g., A, B, C, D, E, F, and G), the server's response, in step 508, may include information that the designated group is active with five participants (e.g., A, B, C, F, and G), and the nonparticipating members of the designated group are either registered (e.g., user D) or not (e.g., user E).

In one embodiment, the presence and/or location information may be shared among the members of a designated group without establishing a communication session, e.g., without talking; thus, providing better privacy for the group members.

In one embodiment, the presence and/or location information may be shared among the members of a designated group without burdening the group communication server with group configuration; thus, providing the service providers easy ways of billing each user based on their activity.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

The invention claimed is:

1. A method for sharing user information performed at a group communication server (GCS) in a wireless communication network outside of a call setup, the method comprising:
   receiving a group message from an originator, the group message including group information about a designated group of targets and an availability information request about the designated group of targets;
   transmitting an alert to the designated group of targets, including a first target and a second target;
   determining first availability information about the first target of the designated group of targets based on a response or lack of response from the first target, wherein, if there is a response, the first availability information about the first target is determined based on the response, and if there is no response, the first target is determined to be unavailable;
   determining second availability information about the second target of the designated group of targets based on a response or lack of response from the second target, wherein, if there is a response, the second availability information about the second target is determined based on the response, and if there is no response, the second target is determined to be unavailable; and
   transmitting, outside of a call setup, group availability information to the originator that includes the first availability information about the first target and the second availability information about the second target, wherein the first availability information includes information as to whether the first target is registered.

2. The method of claim 1, wherein:
   receiving the group message further comprises receiving originator availability information about the originator; and
   transmitting the alert to the designated group of targets further comprises transmitting the originator availability information to the designated group of targets.

3. The method of claim 1, further comprising transmitting the first availability information about the first target to the second target in the designated group of targets.

4. The method of claim 1, wherein the first availability information includes location information about the first target.

5. A non-transitory computer-readable medium comprising instructions, which, when executed by a group communication server (GCS), causes the GCS to perform operations for sharing user information in a wireless communication network outside of a call request, the instructions comprising:
   a set of instructions to receive a group message from an originator, the group message including group information about a designated group of targets and an availability information request about the designated group of targets;
   a set of the instructions to transmit an alert to the designated group of targets, including a first target and a second target;
   a set of the instructions to determine first availability information about the first target of the designated group of targets based on a response or lack of response from the first target, wherein, if there is a response, the first availability information about the first target is determined based on the response, and if there is no response, the first target is determined to be unavailable;
   a set of the instructions to determine second availability information about the second target of the designated group of targets based on a response or lack of response from the second target, wherein, if there is a response, the second availability information about the second target is determined based on the response, and if there is no response, the second target is determined to be unavailable; and
   a set of the instructions to transmit, outside of a call setup, group availability information to the originator that includes the first availability information about the first target and the second availability information about the second target, wherein the first availability information includes information as to whether the first target is registered.

6. The non-transitory computer-readable medium of claim 5, wherein:
   the set of instructions to receive the group message further comprises a set of instructions to receive originator availability information about the originator; and the set of instructions to transmit the alert to the designated group of targets further comprises transmitting the originator availability information to the designated group of targets.

7. The non-transitory computer-readable medium of claim 5, further comprising a set of instructions to transmit the first availability information about the first target to the second target in the designated group of targets.

8. The non-transitory computer-readable medium of claim 5, wherein the first availability information includes location information about the first target.

9. A group communication server (GCS) apparatus for sharing user information in a wireless communication network outside of a call setup, comprising:
   means for receiving a group message from an originator, the group message including group information about a designated group of targets and an availability information request about the designated group of targets;
   means for transmitting an alert to the designated group of targets, including a first target and a second target;
   means for determining first availability information about the first target of the designated group of targets based on a response or lack of response from the first target, wherein, if there is a response, the first availability information about the first target is determined based on the response, and if there is no response, the first target is determined to be unavailable;
   means for determining second availability information about the second target of the designated group of targets based on a response or lack of response from the second target, wherein, if there is a response, the second availability information about the second target is determined based on the response, and if there is no response, the second target is determined to be unavailable; and
   means for transmitting, outside of a call setup, group availability information to the originator that includes the first availability information about the first target and the second availability information about the second target, wherein the first availability information includes information as to whether the first target is registered.

10. The GCS apparatus of claim 9, wherein:
    means for receiving the group message further comprises means for receiving originator availability information about the originator; and
    means for transmitting the alert to the designated group of targets further comprises transmitting the originator availability information to the designated group of targets.

11. The GCS apparatus of claim 9, further comprising means for transmitting the first availability information about the first target to the second target in the designated group of targets.

12. The GCS apparatus of claim 9, wherein the first availability information includes location information about the first target.

13. A group communication server (GCS) for sharing user information in a wireless communication network outside of a call setup, comprising a memory unit, a receiver, a transmitter, and a processor coupled to the memory unit, the receiver, and the transmitter, the processor being capable of:
    receiving a group message from an originator, the group message including group information about a designated group of targets and an availability information request about the designated group of targets;
    transmitting an alert to the designated group of targets, including a first target and a second target;
    determining first availability information about the first target of the designated group of targets based on a response or lack of response from the first target, wherein, if there is a response, the first availability information about the first target is determined based on the response, and if there is no response, the first target is determined to be unavailable;
    determining second availability information about the second target of the designated group of targets based on a response or lack of response from the second target, wherein, if there is a response, the second availability information about the second target is determined based on the response, and if there is no response, the second target is determined to be unavailable; and
    transmitting, outside of a call setup, group availability information to the originator that includes the first availability information about the first target and the second availability information about the second target, wherein the first availability information includes information as to whether the first target is registered.

14. The GCS of claim 13, wherein:
    receiving the group message further comprises receiving originator availability information about the originator; and
    transmitting the alert to the designated group of targets further comprises transmitting the originator availability information to the designated group of targets.

15. The GCS of claim 13, the processor further capable of transmitting the first availability information about the first target to the second target in the designated group of targets.

16. The GCS of claim 13, wherein the first availability information includes location information about the first target.

17. A method for sharing user information performed at an originator in a wireless communication network outside of a call setup, the method comprising:
    selecting a designated group of targets from a directory of stored individual and/or group member lists, the designated group of targets including a first target and a second target;
    transmitting a group message to a group communication server (GCS), the group message including group information about the designated group of targets and an availability information request about the designated group of targets;
    receiving, outside of a call setup, group availability information from the GCS that includes first availability information about the first target and second availability information about the second target, wherein the first availability information includes information as to whether the first target is registered; and
    updating presence information about the first target and the second target based on the group availability information.

18. The method of claim 17, wherein receiving the group availability information includes receiving information as to whether the group is active or passive.

19. The method of claim 17, wherein receiving the first availability information includes receiving information as to whether the first target is participating in a current communication session.

20. The method of claim 17, wherein receiving the first availability information includes receiving location information about the first target.

21. A non-transitory computer-readable medium comprising instructions, which, when executed by an originator, causes the originator to perform operations for sharing user information in a wireless communication network outside of a call request, the instructions comprising:
- a set of instructions to select a designated group of targets from a directory of stored individual and/or group member lists, the designated group of targets including a first target and a second target;
- a set of the instructions to transmit a group message to a group communication server (GCS), the group message including group information about the designated group of targets and an availability information request;
- a set of the instructions to receive, outside of a call setup, group availability information from the GCS that includes first availability information about the first target and second availability information about the second target, wherein the first availability information includes information as to whether the first target is registered; and
- a set of the instructions to update presence information about the first target and the second target based on the group availability information.

22. The non-transitory computer-readable medium of claim 21, wherein the set of instructions to receive the group availability information includes a set of instructions to receive information as to whether the group is active or passive.

23. The non-transitory computer-readable medium of claim 21, wherein the set of instructions to receive the first availability information includes a set of instructions to receive information as to whether the first target is participating in a current communication session.

24. The non-transitory computer-readable medium of claim 21, wherein the set of instructions to receive the first availability information includes a set of instructions to receive location information about the first target.

25. An originator apparatus for sharing user information in a wireless communication network outside of a call setup, comprising:
- means for selecting a designated group of targets from a directory of stored individual and/or group member lists, the designated group of targets including a first target and a second target;
- means for sending at least one alert from an originator to a group communication server (GCS) requesting presence information about at least one target user;
- means for transmitting a group message to the GCS, the group message including group information about the designated group of targets and an availability information request about the designated group of targets;
- means for receiving, outside of a call setup, group availability information from the GCS that includes first availability information about the first target and second availability information about the second target, wherein the first availability information includes information as to whether the first target is registered; and
- means for updating presence information about the first target and the second target based on the group availability information.

26. The originator apparatus of claim 25, wherein means for receiving the group availability information includes means for receiving information as to whether the group is active or passive.

27. The originator apparatus of claim 25, wherein means for receiving the group availability information includes means for requesting presence information about a group of target users, and means for receiving includes means for receiving information as to whether the first target is participating in a current communication session.

28. The originator apparatus of claim 25, wherein means for receiving the group availability information includes means for requesting presence information about a group of target users, and means for receiving includes means for receiving location information about the first target.

29. An originator for sharing user information in a wireless communication network outside of a call setup comprising a memory unit, receiver, a transmitter, and a processor coupled to the memory unit, the receiver, and the transmitter, the processor being capable of:
- selecting a designated group of targets from a directory of stored individual and/or group member lists, the designated group of targets including a first target and a second target;
- transmitting a group message to a group communication server (GCS), the group message including group information about the designated group of targets and an availability information request about the designated group of targets;
- receiving, outside of a call setup, group availability information from the GCS that includes first availability information about the first target and second availability information about the second target, wherein the first availability information includes information as to whether the first target is registered; and
- and updating presence information about the first target and the second target based on the group availability information.

30. The originator of claim 29, wherein receiving the group availability information includes receiving information as to whether the group is active or passive.

31. The originator of claim 29, wherein receiving the first availability information includes receiving information as to whether the first target is participating in a current communication session.

32. The originator of claim 29, wherein receiving the first availability information includes receiving location information about the first target.

33. The method of claim 1, wherein receiving the group message from the originator occurs before transmitting the alert to the designated group of targets.

34. The method of claim 1, wherein transmitting the group availability information further comprises transmitting an indication of whether the first target is participating in a group communication session.

35. The method of claim 1, wherein transmitting the alert to the designated group of targets is performed in response to the receiving the group message from the originator.

36. The method of claim 17, wherein transmitting the group message to the GCS is performed subsequent to completing a call setup.

37. The method of claim 36, wherein the call setup is between the originator and the GCS.

38. The method of claim 1, wherein transmitting the alert to the designated group of targets comprises transmitting the alert from the GCS directly to the designated group of targets.

* * * * *